US008266188B2

United States Patent
Bhatia

(10) Patent No.: US 8,266,188 B2
(45) Date of Patent: Sep. 11, 2012

(54) METHOD AND SYSTEM FOR EXTRACTING STRUCTURAL INFORMATION FROM A DATA FILE

(75) Inventor: Rishi Bhatia, Walpole, MA (US)

(73) Assignee: CA, Inc., Islandia, NY (US)

( * ) Notice: Subject to any disclaimer, the term of this patent is extended or adjusted under 35 U.S.C. 154(b) by 895 days.

(21) Appl. No.: 11/074,502

(22) Filed: Mar. 8, 2005

(65) Prior Publication Data

US 2006/0206518 A1   Sep. 14, 2006

(51) Int. Cl.
G06F 7/00 (2006.01)
G06F 17/30 (2006.01)

(52) U.S. Cl. ........................................................ 707/809

(58) Field of Classification Search ................. 707/100, 707/101, 102, 104, 200, 204, 205, 809, 999.102
See application file for complete search history.

(56) References Cited

U.S. PATENT DOCUMENTS

| 6,662,342 | B1 |   | 12/2003 | Marcy | 715/513 |
| 6,760,721 | B1 | * | 7/2004  | Chasen et al. | 707/3 |
| 6,959,415 | B1 | * | 10/2005 | Soderberg et al. | 715/234 |
| 6,973,460 | B1 | * | 12/2005 | Mitra | 707/103 R |
| 7,065,561 | B2 | * | 6/2006  | Fry et al. | 709/219 |
| 7,111,286 | B2 | * | 9/2006  | Schrader et al. | 717/143 |
| 2005/0097128 | A1 | * | 5/2005  | Ryan et al. | 707/103 Y |
| 2005/0203957 | A1 | * | 9/2005  | Wang et al. | 707/104.1 |
| 2005/0234969 | A1 | * | 10/2005 | Mamou et al. | 707/102 |

OTHER PUBLICATIONS

PCT Notification of Transmittal of the International Search Report and the Written Opinion of the International Searching Authority, or the Declaration, for International Application No. PCT/US2006/008504; 12 pages, Jun. 20, 2006.
Girarddot M et al.; "Millau, an encoding format for efficient representation and exchange of XML over the Web"; Computer Networks, Elsevier Science Publishers B.V.; Amsterdam, NL. vol. 33, No. 1-6, pp. 747-765, Jun. 2000.
Vagena Z et al. (University of California, Riverside, CA); "Efficient Processing of XML Containment Queries using Partition-Based Schemes"; Database Engineering and Applications Symposium—IEEE, 2004; pp. 161-170, Jul. 7, 2004.
Cooper, C.; "Using Expat"; O'Reilly XML.com, Sep. 1, 1999.

* cited by examiner

*Primary Examiner* — Aleksandr Kerzhner
(74) *Attorney, Agent, or Firm* — Baker Botts L.L.P.

(57) ABSTRACT

A system and method for generating metadata from a data file are provided. The method includes the steps of parsing a data file having data nodes arranged in a hierarchal structure by sequentially processing the data nodes to generate parsing events and calling back at least one parsing event to a scanner, the scanner processing the at least one parsing event by calling at least one corresponding function. The method also includes the step of generating metadata from the processed at least one parsing event preserving the hierarchal structure of the data nodes.

21 Claims, 7 Drawing Sheets

METHOD AND SYSTEM FOR EXTRACTING STRUCTURAL INFORMATION FROM A DATA FILE

BACKGROUND

1. Field

The present disclosure relates generally to data processing and computing systems, and more particularly, to a method and system for extracting structural information from a data file, e.g., metadata definition from an XML file.

2. Description of the Related Art

XML (Extensible Markup Language) is a markup language for documents containing structured information. Structured information contains both content, e.g., words, pictures, etc., and some indication of what role that content plays, for example, content in a section heading has a different meaning from content in a footnote, which has a different significance than content in a figure caption or content in a database table, etc. Almost all documents have some structure. A markup language is a mechanism to identify structures in a document. The XML specification defines a standard way to add markup to documents.

XML is fast becoming the key language for information exchange over the web. XML/XSD is self-describing and platform independent. Most Fortune™ 500 companies are already using XML for automatic processing of their invoices, billing, accounts, inventory, automatic replenishment and data movement. As applications are increasingly designed to depend upon XML, it is becoming essential to extract XML metadata (i.e., structural information concerning data stored within XML files) in order to replicate the metadata in other types of data structures.

Therefore, a need exists for techniques for extracting structural information from a data file, e.g., an XML file. A further need exists for techniques for automatic extraction of XML metadata.

SUMMARY

The present disclosure provides for a process to effectively extract metadata, e.g., structural information, from an XML file. Provided is a parser for parsing individual data nodes of an XML file and calling back resulting parsing events to a scanner. The parser is adapted to preserve the hierarchal order of the XML file structure and the scanner is adapted to reconstruct the metadata of the XML and to designate the repeating nodes.

According to one aspect of the present disclosure, a method for generating metadata from a data file is disclosed. The method includes the steps of parsing a data file having data nodes arranged in a hierarchal structure by sequentially processing the data nodes to generate parsing events and calling back at least one parsing event to a scanner, the scanner processing the at least one parsing event by calling at least one corresponding function. The method also includes the step of generating metadata from the processed at least one parsing event preserving the hierarchal structure of the data nodes.

According to another aspect of the present disclosure, a system for generating metadata from a data file is disclosed. The system includes a parser to parse a data file including data nodes arranged in a hierarchal structure by sequentially processing the data nodes to generate parsing events and a scanner to receive the at least one parsing event, the scanner configured to process the at least one parsing event by calling at least one corresponding function and to generate metadata from the processed at least one parsing event preserving the hierarchal structure of the data nodes.

According to a further aspect of the present disclosure, a set of computer-executable instructions for generating metadata from a data file is disclosed. The set of computer-executable instructions includes the steps of parsing a data file having data nodes arranged in a hierarchal structure by sequentially processing the data nodes to generate parsing events and calling back at least one parsing event to a scanner, the scanner processing the at least one parsing event by calling at least one corresponding function. The method also includes the step of generating metadata from the processed at least one parsing event preserving the hierarchal structure of the data nodes.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Figure 1:
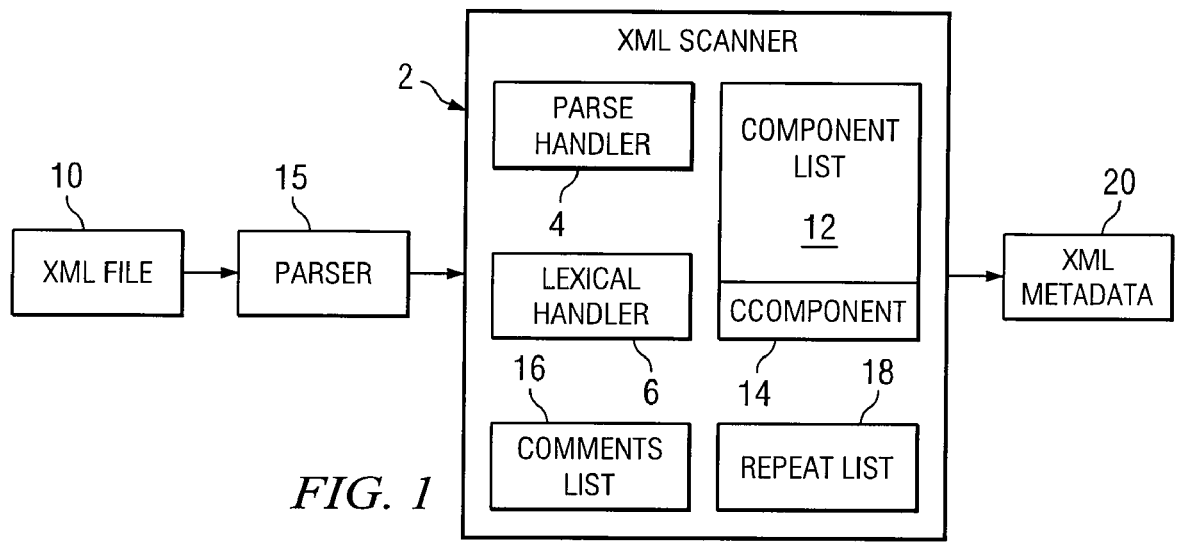
FIG. 1 is a schematic drawing of an XML metadata scanner in accordance with an embodiment of the present disclosure.

Preferred embodiments of the present disclosure will be described herein below with reference to the accompanying drawings. In the following description, well-known functions or constructions are not described in detail to avoid obscuring the present disclosure in unnecessary detail.

Currently, XML editors provide only for manual definition of XML metadata, e.g., structural information. However, such manual methods are very cumbersome to use and are extremely prone to errors. In contrast, the XML metadata extraction method of the present disclosure provides for automatic extraction of a structure of an XML file. The techniques of the present disclosure implement parsing of the structural information of the XML file for elements, attributes, comments, namespaces, etc. and extracting them to create a corresponding XML metadata structure. Provided is a parser to parse an XML file and to call back parsing events to an XML scanner. The XML scanner includes a parse handler which receives the parsing events and constructs a metadata, e.g., a linear component list, of the XML file.

An illustrative example will now be provided to explain the method of the present disclosure. The data stored within an XML file may be very complex, but a simple XML file has been chosen for clarity and to better to explain the process. Shown below is XML File I containing data relating to a business process managing solution.

XML FILE I:

```
<?xml version="1.0" encoding="UTF-8" ?>
<termset>
    <class name="AATerms">
    <instance name="this" />
    <field name="request_type">
    <ire:term description="The type of request (Hardware" display_name="request_type"
             prepost="0" xmlns:ire="www.ca.com/Aion/Analyst/IRE" />
    <datatype_string coll_type="none" />
        </field>
    <field name="request_host">
    <ire:term description="The hostname of the machine associated with the request (AMO ID)"
             display_name="request_host" prepost="0" xmlns:ire="www.ca.com/Aion/Analyst/IRE" />
    <datatype_string coll_type="none" />
        </field>
    <field name="request_trade">
    <ire:term description="Does the request include a trade-in?" display_name="request_trade"
             prepost="0" xmlns:ire="www.ca.com/Aion/Analyst/IRE" />
    <datatype_boolean coll_type="none" />
        </field>
    <field name="request_user">
    <ire:term description="User ID of the requestor." display_name="request_user" prepost="0"
             xmlns:ire="www.ca.com/Aion/Analyst/IRE" />
    <datatype_string coll_type="none" />
        </field>
    <field name="request_band">
    <ire:term description="Band associated with the requestor." display_name="request_band"
             prepost="0" xmlns:ire="www.ca.com/Aion/Analyst/IRE" />
    <datatype_number coll_type="none" precision="0" />
        </field>
    <field name="request_budget">
    <ire:term description="Remaining budget in the relevant department."
             display_name="request_budget" prepost="0" xmlns:ire="www.ca.com/Aion/Analyst/IRE" />
    <datatype_number coll_type="none" precision="0" />
        </field>
    <field name="request_amount">
    <ire:term description="US $ amount associated with the request."
             display_name="request_amount" prepost="0" xmlns:ire="www.ca.com/Aion/Analyst/IRE" />
    <datatype_number coll_type="none" precision="0" />
        </field>
    <field name="request_disposition">
    <ire:term description="AION recommedation." display_name="request_disposition" prepost="1"
             xmlns:ire="www.ca.com/Aion/Analyst/IRE" />
    <datatype_string coll_type="none" />
        </field>
    <field name="request_budget_code">
    <ire:term description="Account code." display_name="request_budget_code" prepost="0"
             xmlns:ire="www.ca.com/Aion/Analyst/IRE" />
    <datatype_number coll_type="none" precision="0" />
        </field>
    <field name="new_machine">
    <ire:term description="" display_name="new_machine" prepost="0"
             xmlns:ire="www.ca.com/Aion/Analyst/IRE" />
    <datatype_boolean coll_type="none" />
        </field>
    <field name="in_amo">
    <ire:term description="Is the machine in AMO?" display_name="in_amo" prepost="0"
             xmlns:ire="www.ca.com/Aion/Analyst/IRE" />
    <datatype_boolean coll_type="none" />
        </field>
    <field name="budget_locked">
    <ire:term description="" display_name="budget_locked" prepost="0"
             xmlns:ire="www.ca.com/Aion/Analyst/IRE" />
    <datatype_boolean coll_type="none" />
        </field>
        </class>
        </termset>
```

The first line of XML File I is the XML declaration and it defines the XML version and character encoding used in the XML file. The illustrated XML declaration shows that XML File I conforms to the 1.0 specification of XML and uses the UTF-8 character set. The XML 10 file is made up of plurality nodes. A node can be an element, a comment, CDATA, etc. Elements are the most common nodes used in XML and are data structures containing specific content defined by start and end tags. For instance, "termset" is an element having a start tag of "<termset >" and an end tag "</termset>." Furthermore, elements may include multiple types of content, such as element content (e.g., other elements), mixed content (e.g., both text and other elements), and simple content (e.g., only text content). Primarily, elements include simple content, however, other elements, such as "termset," include elemental content and contain all the elements and data structures listed in between its start and end tags (e.g., "instance," "field," etc.). In addition, "termset" is also known as the root element since it is the first element in the XML file and occupies level 0. Subsequent elements occupy levels numbered in ascending order. For example, the first element within the root element (i.e., "class"), which is generally known as a top level element, occupies level 1.

The elements within XML File I have a hierarchal structure, e.g., an element that includes another element is considered to be a parent thereof and the other element is considered to be a child. For example, the element "field" is the parent of the elements "ire:term" and "datatype_string", both of which are subchildren of the element "class." Parent elements are also known as records since they contain other elements.

Elements may also include attributes which are listed within the start tag and provide additional information about the element. For instance, the element "class" includes an attribute called "name" having a value of "AATerms". Unlike elements, attributes do not have a hierarchal structure and always belong to a single element.

Since element names in XML files are not fixed, there is a possibility of a name conflict if two different XML files use the same names to describe two different types of elements. To avoid this problem, XML allows its users to define namespaces thereby giving a unique name to each element. A namespace requires attachment of a prefix to the element name, such as "ire:" to the element "ire:term" and assignment of a namespace to the prefix. The namespace may be a Uniform Resource Identifier (URI) such as a Uniform Resource Locator (URL). In the present case, the prefix "ire:" is associated with "www.ca.com/Aion/Analyst/IRE."

The XML File I may also include text other than XML recognizable commands, such as XML comments and CDATA. The comments are generally used to provide additional information about the code of the XML file. CDATA may be used to include any text that the user wishes for the parser to ignore. The XML comments are denoted by using "<! - - - >" and the CDATA is denoted by the command "<[!CDATA[]]>".

Shown below is another XML, XML File II, containing data relating to a purchase order.

XML FILE II:

```
<?xml version="1.0" encoding="UTF-8" standalone="yes" ?>
<PurchaseOrder>
 <Orders>
  <OrderID>10248</OrderID>
  <CustomerID>VINET</CustomerID>
  <EmployeeID>5</EmployeeID>
  <Comment>Excellent experience!!</Comment>
  <Comment>The shipment was received on time</Comment>
  <OrderDate>Jul 4, 1996 12:00:00 AM</OrderDate>
  <RequiredDate>Aug 1, 1996 12:00:00 AM</RequiredDate>
  <Product>
   <ProductID>11</ProductID>
   <UnitPrice>$14.00</UnitPrice>
   <Quantity>12</Quantity>
   <Discount>0</Discount>
   <Supplier>
    <SupplierID>2</SupplierID>
    <CompanyName>New Orleans Cajun Delights</CompanyName>
    <ContactName>Shelley Burke</ContactName>
    <Phone>(100) 555-4822</Phone>
   </Supplier>
   <Supplier>
    <SupplierID>3</SupplierID>
    <CompanyName>Grandma Kelly's Homestead</CompanyName>
```

XML FILE II:

```
    <ContactName>Regina Murphy</ContactName>
    <Phone>(313) 555-5735</Phone>
   </Supplier>
  </Product>
  <Product>
   <ProductID>11</ProductID>
   <UnitPrice>$14.00</UnitPrice>
   <Quantity>12</Quantity>
   <Discount>0</Discount>
  </Product>
 </Orders>
 <Orders>
  <OrderID>10249</OrderID>
  <CustomerID>TOMSP</CustomerID>
  <EmployeeID>6</EmployeeID>
  <Comment>Excellent experience!!</Comment>
  <Comment>The shipment was received on time</Comment>
  <OrderDate>Jul 5, 1996 12:00:00 AM</OrderDate>
  <RequiredDate>Aug 16, 1996 12:00:00 AM</RequiredDate>
  <Product>
   <ProductID>72</ProductID>
   <UnitPrice>$34.80</UnitPrice>
   <Quantity>5</Quantity>
   <Discount>0</Discount>
   <Supplier>
    <SupplierID>2</SupplierID>
    <CompanyName>New Orleans Cajun Delights</CompanyName>
    <ContactName>Shelley Burke</ContactName>
    <Phone>(100) 555-4822</Phone>
   </Supplier>
   <Supplier>
    <SupplierID>3</SupplierID>
    <CompanyName>Grandma Kelly's Homestead</CompanyName>
    <ContactName>Regina Murphy</ContactName>
    <Phone>(313) 555-5735</Phone>
   </Supplier>
  </Product>
  <Product>
   <ProductID>14</ProductID>
   <UnitPrice>$18.60</UnitPrice>
   <Quantity>9</Quantity>
   <Discount>0</Discount>
   <Supplier>
    <SupplierID>2</SupplierID>
    <CompanyName>New Orleans Cajun Delights</CompanyName>
    <ContactName>Shelley Burke</ContactName>
    <Phone>(100) 555-4822</Phone>
   </Supplier>
   <Supplier>
    <SupplierID>3</SupplierID>
    <CompanyName>Grandma Kelly's Homestead</CompanyName>
    <ContactName>Regina Murphy</ContactName>
    <Phone>(313) 555-5735</Phone>
   </Supplier>
  </Product>
  <Product>
   <ProductID>42</ProductID>
   <UnitPrice>$9.80</UnitPrice>
   <Quantity>10</Quantity>
   <Discount>0</Discount>
   <Supplier>
    <SupplierID>2</SupplierID>
    <CompanyName>New Orleans Cajun Delights</CompanyName>
    <ContactName>Shelley Burke</ContactName>
    <Phone>(100) 555-4822</Phone>
   </Supplier>
   <Supplier>
    <SupplierID>3</SupplierID>
    <CompanyName>Grandma Kelly's Homestead</CompanyName>
    <ContactName>Regina Murphy</ContactName>
    <Phone>(313) 555-5735</Phone>
   </Supplier>
  </Product>
  <Product>
   <ProductID>51</ProductID>
   <UnitPrice>$42.40</UnitPrice>
   <Quantity>40</Quantity>
   <Discount>0</Discount>
```

-continued

XML FILE II:

```
<Supplier>
    <SupplierID>2</SupplierID>
    <CompanyName>New Orleans Cajun Delights</CompanyName>
    <ContactName>Shelley Burke</ContactName>
    <Phone>(100) 555-4822</Phone>
        </Supplier>
<Supplier>
    <SupplierID>3</SupplierID>
    <CompanyName>Grandma Kelly's Homestead</CompanyName>
    <ContactName>Regina Murphy</ContactName>
    <Phone>(313) 555-5735</Phone>
        </Supplier>
        </Product>
<Product>
    <ProductID>72</ProductID>
    <UnitPrice>$34.80</UnitPrice>
    <Quantity>5</Quantity>
    <Discount>0</Discount>
        </Product>
        </Orders>
        </PurchaseOrder>
```

XML File II contains data pertaining to a plurality of orders placed with a corporation. The element "Orders" contains identifying information concerning the customer who placed the order (e.g., "CustomerID"), the employee who received and processed the order (e.g., "EmployeeID"), the date the order was placed (e.g., "OrderDate"), and the expected date of delivery of the product (e.g., "RequiredDate"). Furthermore, every order has a repeating element called "Comments" that contains customer comments about the delivery process and their interaction with the company's employees and suppliers.

Each order may be for a plurality of products, therefore, the "Orders" element may contain a repeating element "Product" to record the information concerning the ordered product, such as the price (e.g., "UnitPrice"), the amount of product (e.g., "Quantity"), etc. In addition, the product may be supplied by multiple suppliers, hence, the "Product" element includes a repeating element "Supplier" to record supplier's information (e.g., contact information).

FIG. 1 shows an XML metadata scanner 2 in accordance with an embodiment of the present disclosure. The XML scanner 2 may be a standalone DLL file which may be called by an external caller. The XML scanner 2 may receive the name of an XML file 10 (e.g., XML Files I or II) to be processed through a command line prompt or another type of user interface.

The XML scanner 2 parses the XML file 10 to extract XML metadata 20 (e.g., elements, attributes, namespace, comments, CDATA, etc.) and builds a linear component list, e.g., Component List 12. The Component List 12 may then be presented for output or it may be used to create a database containing the same fields as the XML file 10.

The XML scanner 2 uses a parser 15 to parse the XML file 10. Preferably, the parser 15 is based on an SAX parser which is an event-based API parser. There are two types of XML API's: a tree-based API and an event-based API. Tree-based API parsers map an XML file into an internal tree structure, then allow an application to navigate that tree. However, these parsers put a great strain on system resources, especially if the document is large, since they load an entire XML file into a system's memory.

Conversely, an event-based API parser, such as the parser 15, reports parsing events (e.g., extracted elements) directly to the application (e.g., the XML scanner 2) through callbacks, and does not build an internal tree. The XML scanner 2 implements handlers to deal with the different events, much like handling events in a graphical user interface. Therefore, the XML scanner 2 does not navigate the entire XML file in building the XML metadata 20 and only recreates the specific nodes being called back by the parser 15. This allows the XML scanner 2 to create an external data structure while conserving valuable system resources.

The XML scanner 2 includes a parse handler 4 and a lexical handler 6. The parse handler 4 is primarily responsible for issuing processing calls to the parser 15 and for receiving parsing events through call backs from the parser 15 which scans the nodes of the XML file 10. In addition, the parse handler 4 also processes error messages and content of the elements. Since the parse handler 4 is preferably based on an SAX2XMLReader's core API (a conventional SAX API), which does not support lexical components, the parse handler 4 is also not capable of handling lexical components of the XML file 10. Therefore, the lexical handler 6 extracts the lexical components of the XML file 10 for later processing by the parse handler 4. The lexical handler 6 is preferably based on an XERCES::SAX2::LexicalHandler (a conventional SAX API). Therefore, the lexical handler 6 processes all the lexical events, such as comments and CDATA sections. For multi-line comments, the lexical handler 6 maintains a Comments List 16. The parse handler 4 checks the list while processing elements and, if the Comments List 16 contains any comments, the parse handler 2 later retrieves the comments. Furthermore, the XML scanner 2 implements any additional handlers necessary to deal with events called back by the SAX parser. For instance, XML Scanner 2 implements the following functions: startElement( ), endElement( ), characters( ), and error( ), which are call back functions that are invoked or triggered as a result of a parsing event; startElement( ) is called when the start tag of an element is parsed from the XML file 10. Similarly, EndElement( ) is invoked when the end tag of an element is parsed. FIG. 2B provides a flowchart showing different branches appropriate to the parsing events and the corresponding call back functions as will be discussed in more detail below.

The parse handler 4 stores each of the parsed XML elements called back by the parser 15 in an individual corresponding component of type CComponent 14. The CComponent 14 is a specialized data structure which is responsible for storing XML element's properties such as the element's parent information, whether the element is repeating, the element's name, the element's namespace, the element's level, etc. In addition, the CComponent 14 includes a plurality of attributes (e.g., of boolean type) which indicate whether the component possesses certain attributes, such as a namespace. The CComponent 14 is then stored in the Component List 12 which is a typed pointer list. The Component List 12 is returned by the XML scanner 2 to an external caller.

In addition, the XML scanner 2 utilizes a stack to insert references to extracted elements. A reference of each of the extracted elements is inserted into the stack and, once all the elements are processed, the XML scanner 2 pops the inserted references. The stack may be a conventional data structure for storing items which are to be accessed in "last-in first-out" order. Since the stack operates according to the "last-in first-out" principal, the stack maintains the hierarchal order according to which the elements were extracted so that after all of the elements are extracted, the XML scanner 2 recreates the hierarchy of the elements. Those skilled in the art will understand that the above-described data structures represent an exemplary embodiment and that different types of data structures may be used.

The XML scanner 2 also flags certain elements and records as repeating. A repeating element is an element which occurs more than once (e.g., the "Phone" element) and a repeating record is a repeating element which includes children elements (e.g., the "Address" element). The repeating elements are included only once in the XML metadata 20. This is accomplished by only including a single instance of the repeating elements and/or records in the Component List 12 and a reference to the repeating element in the Repeat List 18. Since the XML metadata 20 represents the structure of the data of the XML file 10 rather than the data itself, it is counterproductive to list a repeating element or a record more than once. The XML scanner 2 uses a specialized linear list, e.g., a Repeat List 18, to track repeating records by storing references to these records.

Figure 2A:
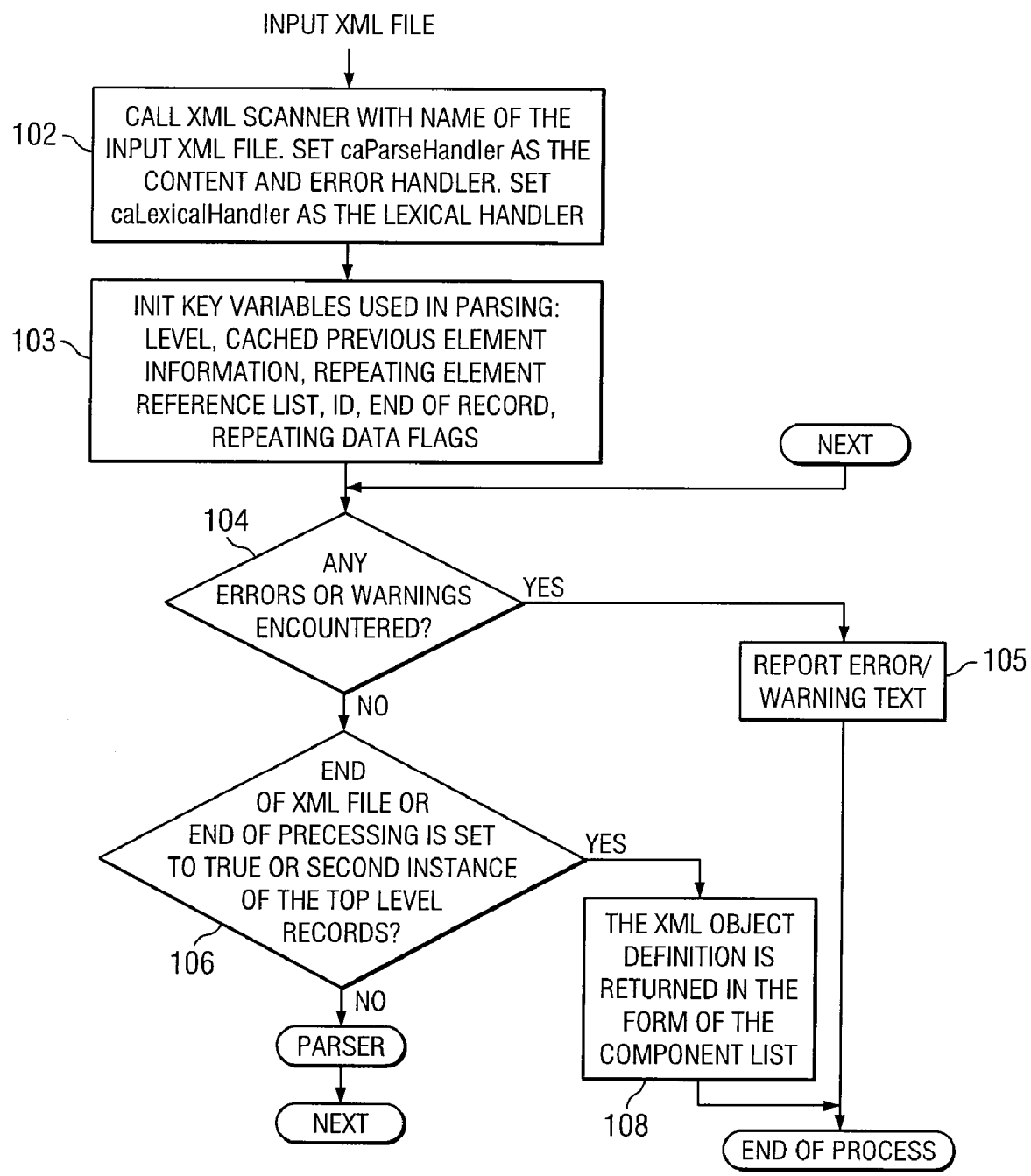
FIGS. 2A-H is a flowchart illustrating a method for extracting XML metadata in accordance with an embodiment of the present disclosure.
Figure 2B:
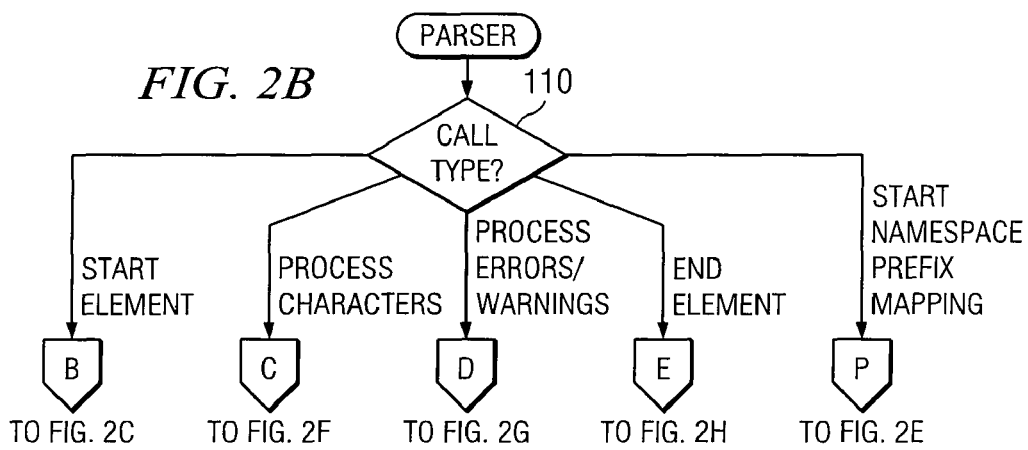

Referring to FIGS. 2A-H, a detailed flowchart of the method for extracting XML metadata 20 is illustrated. More particularly, as shown in FIG. 2A, the XML scanner 2 is called to scan the name of the XML file 10 in step 102. Initially, the XML scanner 2 verifies that the XML file 10 exists, that it is readable, and has a legible XML format. Verification may also include validation that the XML file conforms to the rules of a Document Type Definition (DTD) or Schema, which define the legal building blocks of an XML file. If the verification cannot be accomplished, the XML scanner 2 may declare an exception.

In step 103, the XML scanner 2 constructs the parse handler 4 and the lexical handler 6. In addition, the XML scanner 2 initializes key variables which are part of the CComponent 14, Component List 12, Comments List 16, and the Repeat List 18. Prior to commencing and throughout processing of the XML file 10, in steps 104 and 106 the XML scanner 2 determines whether the parsing process should terminate. Termination may be triggered when the XML scanner 2 encounters the end of the XML file 10, an error, or a second instance of a top level element (e.g., the first element following the root element).

In step 104, the XML scanner determines if any errors occurred during parsing. If an error is encountered, then in step 105, the XML scanner 2 generates an error warning and the parsing process is terminated. Error processing is discussed in more detail below in conjunction with FIG. 2G. In addition, in step 106, the XML scanner 2 verifies if there are any nodes which may be processed. If there are no more nodes to be processed, the XML scanner 2 terminates processing. If the scanning process is finished, in step 108, the XML scanner 2 returns the XML metadata 20 in step 108.

If the XML file 10 includes unprocessed nodes (step 106), then the scanning process continues. With reference to FIG. 2B, in step 110, the type of the function performed by the parser 15 is determined. The parse handler 4 will issue processing calls to the parser 15 which calls back the parse handler 4 with parsing events. The processing calls issued by the XML scanner 2 include: commence element processing (B), character processing (C), namespace prefix mapping (P), error and warning processing (D), and terminate element processing (E).

The sequence in which the processing calls are issued is determined by the parsing events generated by the parser 15. XML Scanner 2 call back functions are invoked or triggered as a result of parsing events, e.g., startElement( ) is called when the start tag of an element is parsed from the XML file and commence element processing (B) call is received. Similarly, EndElement( ) function is invoked when the end tag of an element is parsed and terminate element processing (E) call is received. In addition, the character data for an element is parsed using characters( ) routine once character processing (C) call is received. When a new namespace is parsed, the startPrefixMapping( ) routine in response to a namespace prefix mapping (P) call. Finally, when the end tag or the root element is parsed, the parser 15 will call EndElement( ). Error/Warning functions can be called anytime whenever the parser 15 encounters a problem with the XML file 10.

Figure 2D:
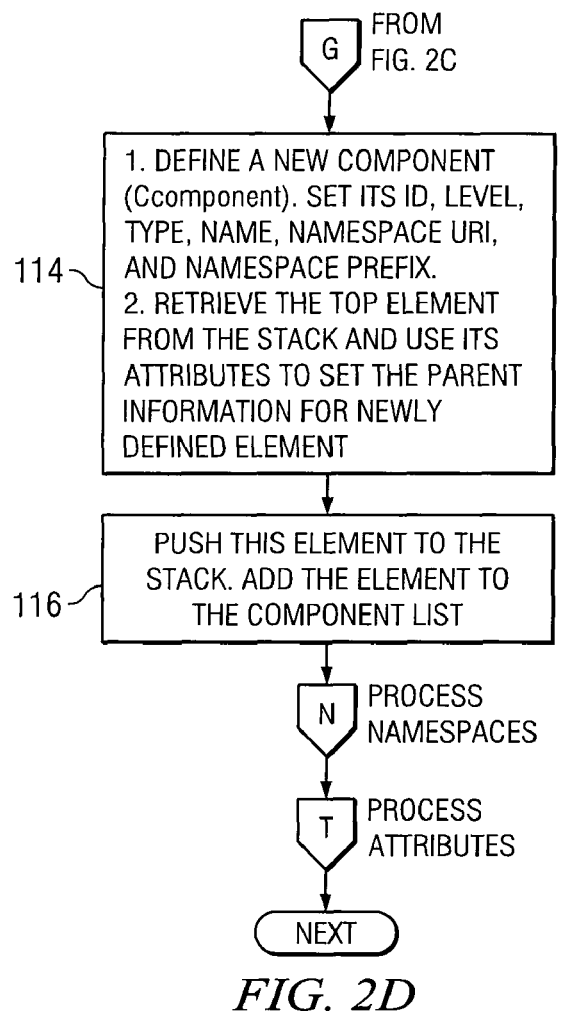
Figure 2C:
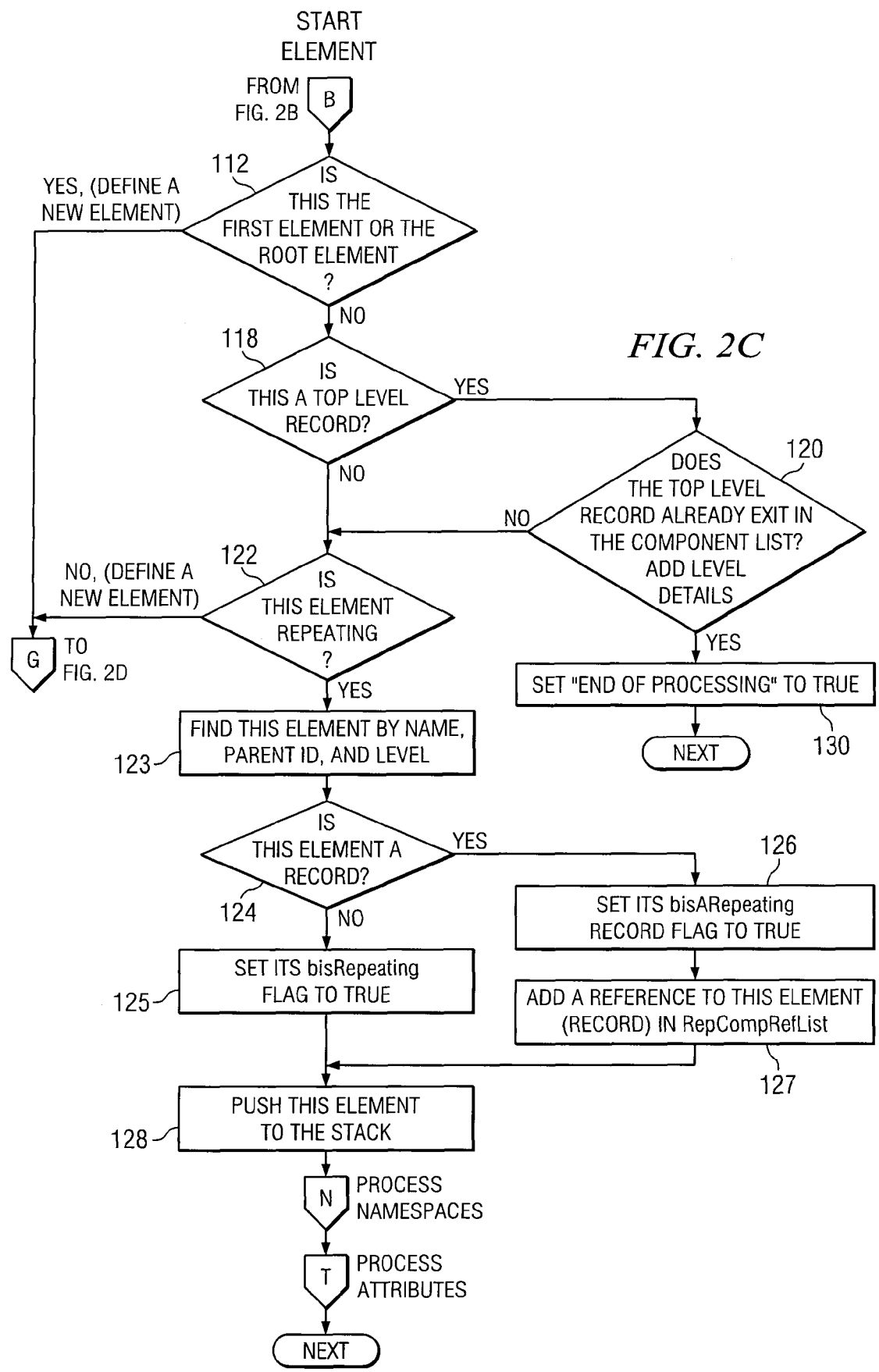

As shown in FIG. 2C, once the commence element processing call (B) is received, the elements are processed in descending order from the top-most element. In step 112, element processing commences and it is initially determined whether an element is a root element. If the element is the root element, then in step 114, as shown in FIG. 2D, the element is defined as a component (e.g., an object of type CComponent 14). Definition of the component includes setting the component's ID, level, type, name, namespace URI, and namespace prefix as well as parent ID, parent's name, and parent level. This information not only defines the element itself, but its relationship to other elements so that after the elements are processed the structural information, including the hierarchal structure may be recreated in the XML metadata 20. After the component is defined, the component is added to the Component List 12 and a reference to the element is pushed into the stack in step 116. New components are continually added, corresponding to the processed elements, until terminate element processing (E) call is received. At that point, the references to the elements of the stack are popped. The stack is used to keep track of the hierarchal structure of the XML file 10 by preserving the parent-child relationships. References of all of the elements processed are added to the stack. Thus, an element of the XML file 10 is recreated in two instances. The first instance, is a reference to the element in a stack, which stores the order that the elements were processed in. The second instance, is a component which includes the information stored within the element as well as other identifying data.

Figure 2E:
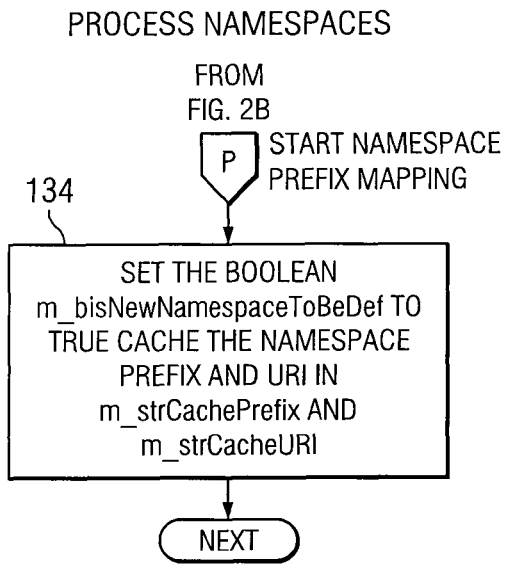
Figure 2E:
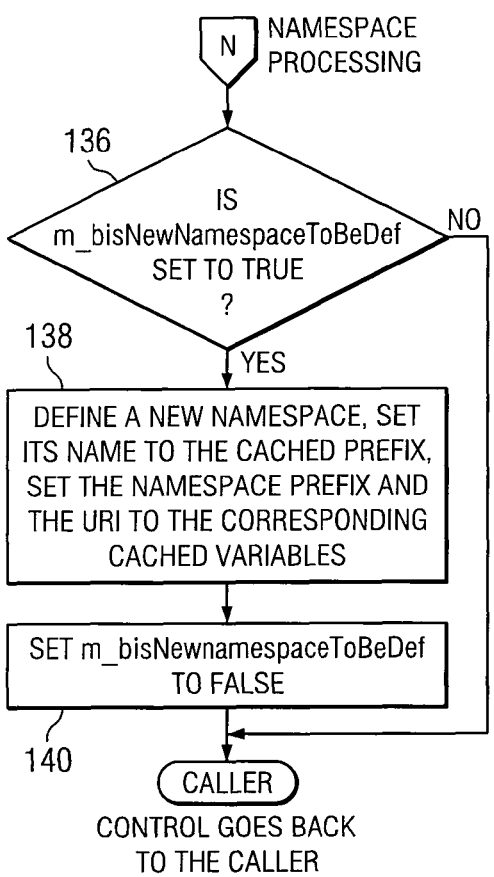

After defining the element as a component, the namespace and the attribute, if present, are processed once the namespace prefix mapping call (P) is received and are added to the Component List 12 as shown in FIG. 2E. Upon encountering a namespace, in step 134, the process maps the namespace and the associated prefix by setting the corresponding component attribute to TRUE and caching the namespace and the prefix. In step 136, the mapped namespaces are processed by checking whether the namespace component attribute is set to TRUE. If yes, then in step 138, a new namespace component is created having its namespace and prefix attributes set according to the namespace and prefix cached in step 134. In step 140, the namespace component attribute is set to FALSE to clear this flag of the definition of a namespace component.

If the namespace prefix mapping call (P) is made but the namespace component attribute is set to FALSE, an error will be generated and the error and warning processing call (D) is made. Error handling is shown in FIG. 2G. In step 142, the error message is retrieved and is set in the instance of a user defined exception class (e.g., CXMLScannerException). In addition, the exception is thrown so that the XML scanner 2 may trap the error. During the error and warning processing call (D), in step 144, an error flag is set to TRUE. Furthermore, if an error is encountered, the process may terminate as discussed in step 106 of FIG. 2A. The error encountered during the namespace prefix mapping call (P) is only one example of an exception that may be handled by the XML scanner 2.

Referring back FIG. 2C, and more particularly to step 112, if the element being processed is not a root element, the process proceeds to step 118 to determine if the element is a top level record. As discussed above, a top level record is an element which contains other elements and occupies level 1. If the element is a top level record, then the process also verifies whether the top level record already exists in the Component List 12 in step 120. If yes, then one of the conditions for termination of scanning of the XML file 10 is satisfied in step 130 and the scanning process ends.

If the element is not a top level record or a top level record that has previously been added to the Component List 12, in step 122, the process determines whether the element or record is repeating. A repeating element is a repeating record if it includes other elements. Top level records are treated as repeating by default and are not marked as repeating in the metadata definitions, since top level records by default include repeating records and/or nodes. The process would mark an element as repeating if the same element already exists at the same level (e.g., the repeating element shares the same parent as the existing element).

If the element is non-repeating, then as shown in FIG. 2D, first its determined that whether the element already exists, so the element is searched in the Component List by name, ParentID & Level. If the element doesn't exist then a new element is defined by going to Step G (step 114). But if the element is found then element property is checked to determine if it belongs to a repeating record? If it doesn't belong to a repeating record, then a new element is defined by going to Step G (step 114). But if the element belongs to a repeating record then a check is made to determine if the element has been scanned twice since the Repeating record was added to the repeat list, if yes then the element is marked as a repeating element. If its not scanned twice since the Repeating record was added to the repeat list the processing simply goes to Next.

The new element is defined in step 114, the process defines the element as a component and sets the component's ID, level, type, name, namespace URI, and namespace prefix. The defined component is then added to the Component List 12 and pushed into the stack in step 116. Also, the reference to the top element in the stack is pulled out and its information is used to define the parental attributes for the newly defined element. This allows for preservation of the parent-child hierarchal relationship within the Component List 12. Thus, a reference to any element is inserted into the stack and the Component List 12. In addition, the namespace and the attribute, if present, are processed and are added to the Component List 12.

In step 124, it is determined if the repeating element is a repeating record. If the repeating element is not a repeating record, then in step 125, the process marks an existing/original element as repeating if the same element already exists at the same level (e.g., the repeating element shares the same parent as the existing element) by setting a corresponding boolean flag denoting that the element is repeating (e.g., blsRepeating) as TRUE.

If the element is a repeating record, then in step 126, the process marks an existing/original record as repeating in the Component List 12 if the same record already exists at the same level by setting a corresponding boolean flag denoting that the record is repeating (e.g., blsRepeatingRecord) as TRUE. In addition, a reference to record is added to the Repeat List 18 in step 127. In step 128, a reference to the repeating element and/or a repeating record is also pushed into the stack. However, a repeating element or record is not defined as a component and is not added to the Component List 12 since a component of the same element or record already exists (e.g., because the metadata for this record is only defined therein). In addition, the namespace and the attribute, if present, are processed.

Figure 2F:
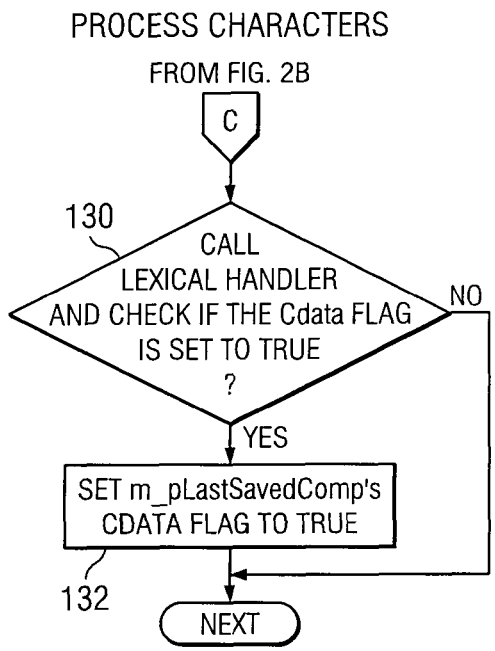
Figure 2G:
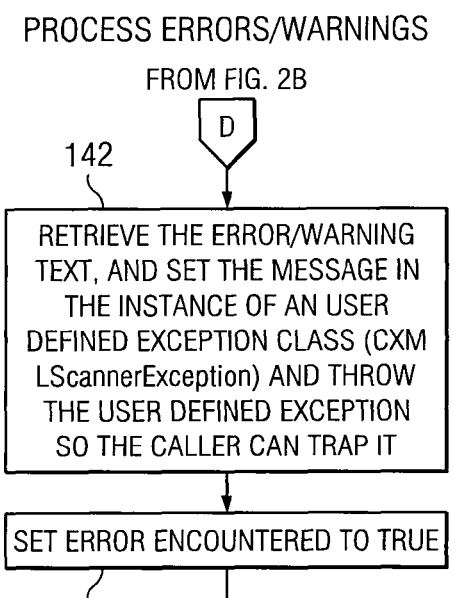

After scanning the elements, the XML scanner 2 may process character information which includes comments and CDATA sections once a character processing call (C) is received as shown in FIG. 2F. The XML scanner 2 uses the lexical scanner 6 to process lexical components (e.g., comments and CDATA). When the lexical handler 6 encounters a lexical component, it may set a flag, such a boolean CDATA flag to TRUE, and adds the lexical component to the Comments list 16. The CDATA flag denotes that there is CDATA, a different boolean flag may be used to denote that there are other comments within the XML file 10. During character processing, parse handler 4 is called and, in step 130, it checks whether the CDATA flag is set to TRUE. If the flag is set to TRUE, then the parse handler 4 also sets a corresponding attribute of the last inserted component as TRUE. This associates the CDATA with the previous component and notifies the user of the relative location of the CDATA string within the XML file 10. In addition, the parse handler 4 retrieves the comments or CDATA from the comments list 16 and adds them to the Component List 12.

Figure 2H:
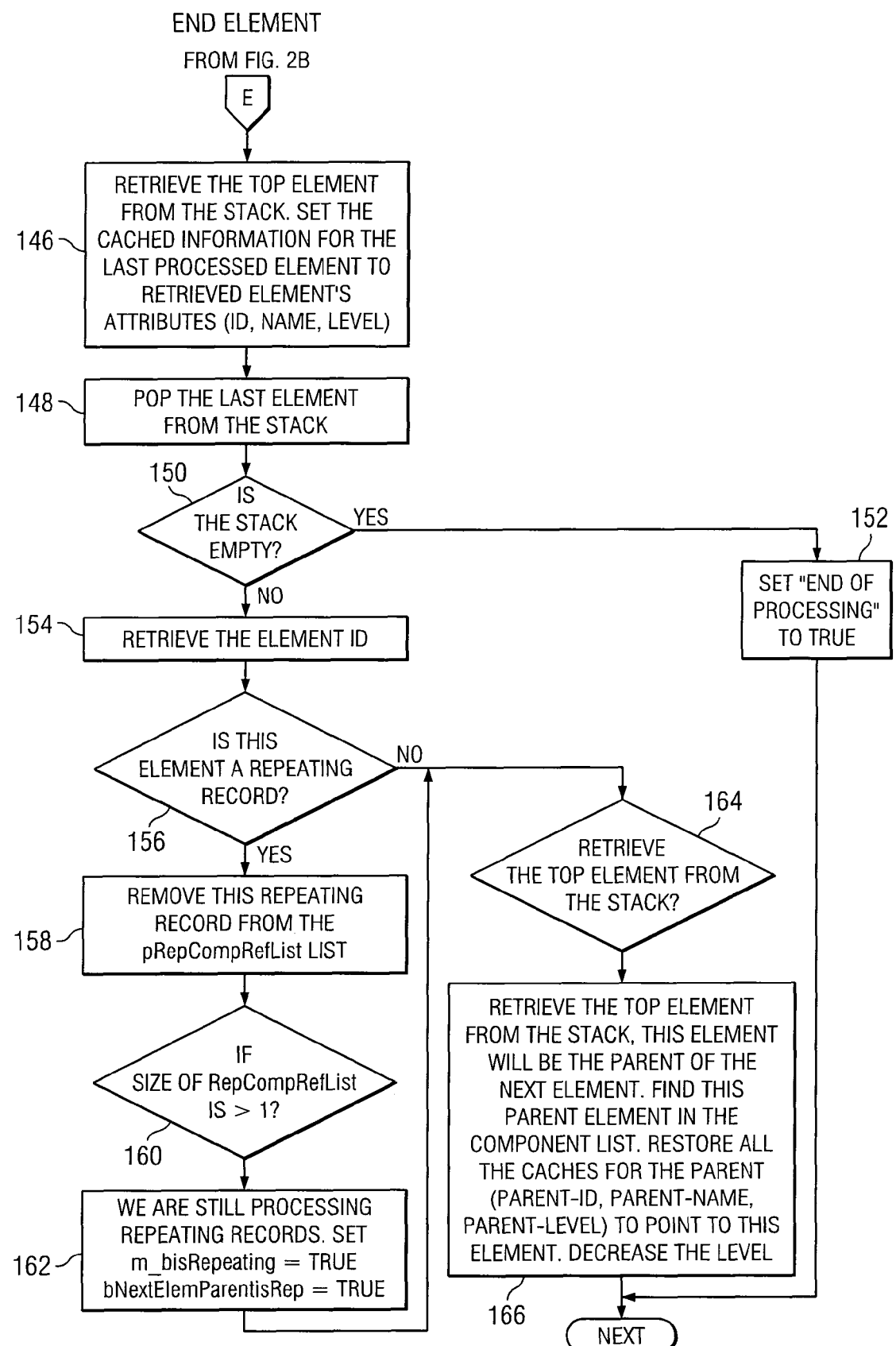

After the last element is processed (e.g., the corresponding component is created and a reference to it is pushed into the stack), the terminate element processing call (E) is initiated. Referring to FIG. 2H, in step 146, the reference to the top element is retrieved from the stack (e.g., the last pushed element) and the element's parameters from the corresponding component in the Component List 18 are also obtained and cached. Caching of the popped element's information is important in recreating the structure of the elements within the XML file 10, since it allows the XML scanner 2 to recreate the relationship between the elements. In step 148, once information is cached, the reference to the element is popped from the stack. The process, in step 150, verifies whether the stack is empty. If the stack is not empty and includes additional elements, then the popped element's ID is retrieved in step 154.

The process determines, in step 156, whether the popped element is a repeating record. If the element is a repeating record then in step 158, the process removes the previously made reference to this repeating record in Repeat List 18. Repeating records are also tracked via a reference list—the Repeat List 18. Any time a repeating record is parsed, the parsing routines will add a new reference to this list. The Repeat List 18 maintains active repeating record references to unwind nested records and recreate the structure of the XML file 10.

In addition, in step 160, the process verifies whether the Repeat List 18 contains any additional references. For example, if the size of the Repeat List 18 is larger than one, then it contains at least another reference to a repeating element. Once a reference to the repeating element is removed from the Repeat List 18, another reference to the repeating element is removed from the stack to recreate the hierarchal relationship. This step facilitates processing of nested repeating records, for example, "supplier" record which is nested in "product" record, which are both repeating as illustrated in example XML file 2.

In step 164, the reference to the next top element is popped. In step 166, a corresponding defined component of the popped element is retrieved from the Component List 12. In addition, the previously cached parent information of step 146 is compared with the identifying information of the currently popped component of step 166. This allows for cached information from the previously extracted element (e.g., ID, name, level, etc.) to be used as parent-identifier information for the currently-being processed element. Thus, when the reference to the next element is popped from the stack, it is the child of the previously popped element and the newly popped element's parent information is set according to the previously extracted parent-identifier information.

Extraction of element references from the stack continues until the stack is empty. If the process, in step 150, determines that the stack has no more elements, then one of the conditions for termination of scanning of the XML file 10 is satisfied and the process ends. The stack is empty after the reference to the root element has been popped, however, it may be preferred, prior to finishing processing, to verify that the generated XML metadata 20 represents the complete the tree of the XML file 10 by validating it against the complete XML file 10. This is preferred since an XML file may change during processing hence structural information previously extracted needs to be updated. The verification that the XML file 10 has not been modified may be implemented in the following manner.

As discussed above, the process terminates if, in step 120, the top level record already exists in the Component List 18. By removing the occurrence of this event as one of the conditions for termination of the parsing process, the XML scanner 2 may continue parsing the XML file 10 to extract any recent changes. Thus, the process in step 120 determines if a top level record has been already defined. If it has been, then instead of stopping the process, a special flag will be set (e.g., bConfirmStructure) to TRUE and the XML Scanner 2 will continue to build upon the metadata 20 created from the first iteration of the parsing process. When bConfirmStructure is set to TRUE, the XML scanner 2 will only add to the initial structure. The scanner will determine if the parsed components exist in the Component List 18 and, if components already exist, then the scanner will do nothing, if newly parsed components are not present therein, then the scanner will add them to the Component List 18. This way the final metadata structure is composed of the whole XML data file regardless whether it has been recently modified.

Figure 3A:
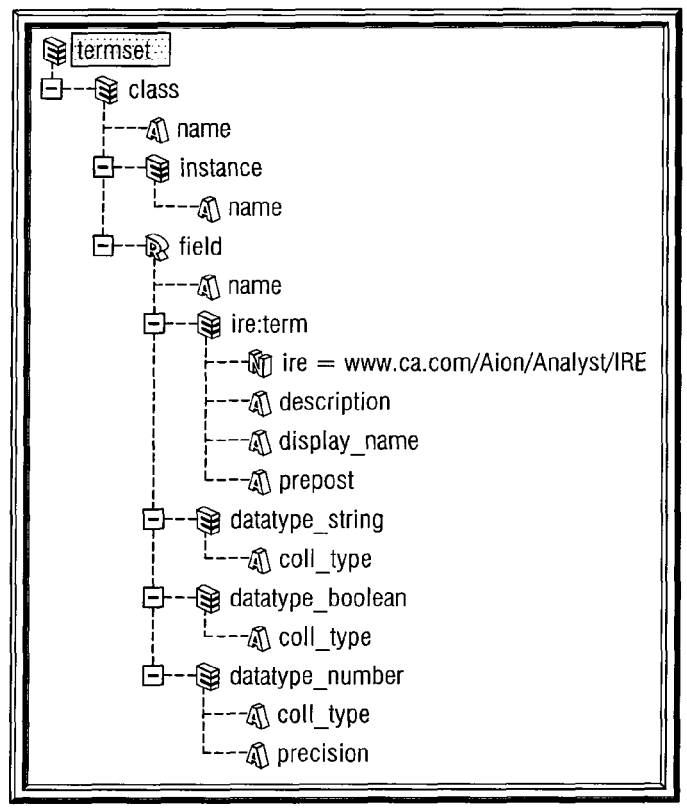
FIGS. 3A-B are screenshots of an output of XML metadata structure extracted from the XML files I and II respectively.

FIG. 3A is a screenshot of an output of metadata extracted from the XML File I. The elements of the XML File I are listed in the hierarchal order of the XML file. The root element "termset" appears on the first line, the top level element "class" follows immediately below, etc. The metadata display includes an exploding trigger "–" which is used to denote that an element is a parent of the elements listed immediately below thereof (e.g., "field" and "ire:term"). In addition, the following letters are used to denote the nodes' qualities: letter "E" denotes a non-repeating element or record, letter "R" denotes a repeating element or record, letter "N" denotes a namespace, and letter "A" denotes an attribute.

Figure 3B:
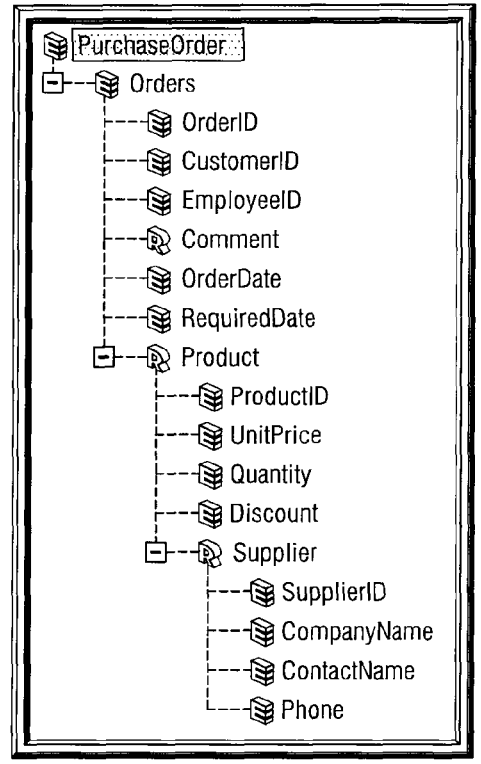

FIG. 3B is a screenshot of an output of metadata from the XML File II. The XML File II provides a better illustration of an XML file having a plurality of repeating elements and the representation thereof as repeating elements (e.g., "R" elements) is shown in the metadata output of FIG. 3B. For instance, the XML File II had three supplier elements for each of the orders, however, only one supplier element is displayed in FIG. 3B, and therefore, although it the element is marked as repeating.

Figure 4:
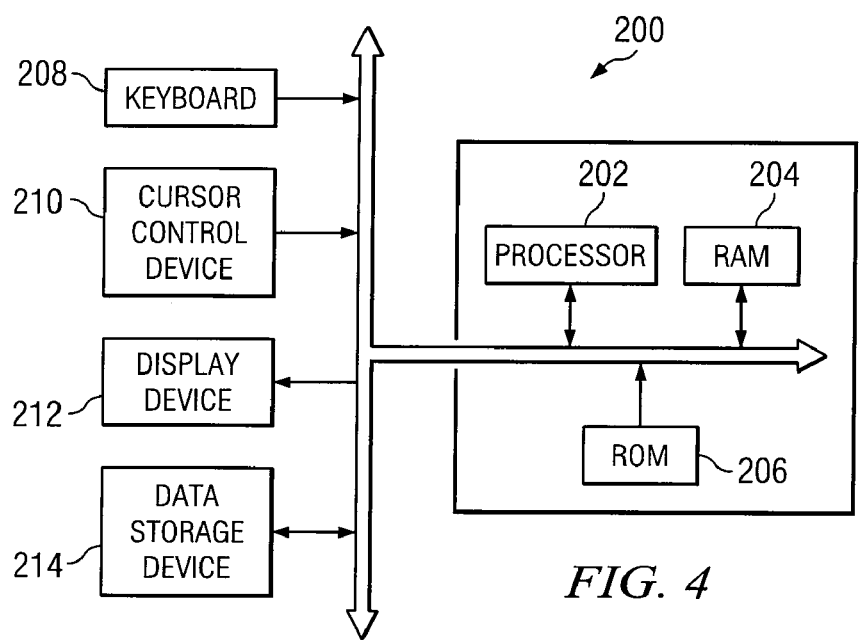
FIG. 4 is an exemplary computer system for implementing various embodiments of the methods of the present disclosure.

Referring to FIG. 4, the process as described in the present disclosure may be adapted as computer-executable instructions stored on a computer-readable media, e.g., data storage device 214 such as a hard drive, magnetic media, optical media, etc., or in read only memory (ROM) 206 of a computer system 200. The computer system 200 comes equipped with a processor 202 and random access memory (RAM) 204. In additional, the computer system 200 is configured with a keyboard 208, mouse or other pointing device 210 and a display 212.

The computer-executable instructions may be loaded from the data storage device 214 to RAM 204 from which the processor 202 reads and executes each instruction, or the processor may access and execute the instructions directly from ROM 206 depending on the manner in which the instructions are stored. Additionally, the data storage device is used to store the XML files to be processed as well as temporary and final results produced by the process as described above. The XML file 10 to be processed may be selected through a combination of keystrokes on the keyboard 208 and manipulation of the pointing device 210, as known in the art. The display device 212, ideally, provides a graphical interface allowing easy visualization of the file storage structure of the data storage device 214 as well as a graphical representation of the process outputs during and after execution.

The described embodiments of the present disclosure are intended to be illustrative rather than restrictive, and are not intended to represent every embodiment of the present disclosure. Various modifications and variations can be made without departing from the spirit or scope of the disclosure as set forth in the following claims both literally and in equivalents recognized in law.

What is claimed is:

1. A method for generating metadata from a data file, the method comprising the steps of:
    parsing a data file including data nodes arranged in a hierarchal structure by sequentially processing the data nodes to generate parsing events, a parsing event comprising a data node extracted from the data file;
    calling back at least one parsing event to a scanner;
    processing by the scanner the at least one parsing event by calling at least one corresponding function;
    flagging, by the scanner, repeating data nodes and adding a reference to each of the repeating data nodes into a repeat list;
    generating a linear list of metadata from the processed at least one parsing event, the linear list of metadata indicating the hierarchal structure of the data nodes and including only a single instance of each flagged repeating data node, the linear list being separate from the repeat list; and
    preserving the hierarchal structure of the data nodes.

2. The method according to claim 1, wherein the processing step comprises the steps of:
    defining a component corresponding to each data node, the component having data pertaining to the each data node and being stored in a component list; and
    generating and inserting a reference to the each data node into a stack, the stack adapted to preserve the hierarchal structure of the data nodes by being a last in first out stack.

3. The method according to claim 2, further comprising the steps of:
    defining a component corresponding to a single instance of the repeating data nodes, the component having data pertaining to the single instance of the repeating data nodes and being stored in a component list; and
    generating and inserting a reference to the single instance of the repeating data nodes into a stack, the stack adapted to preserve the hierarchal structure.

4. The method according to claim 2, wherein the generating metadata step further comprises extracting the reference to the each data node from the stack and the corresponding component from the component list to generate a linear component list.

5. The method according to claim 1, wherein the scanner includes a parse handler for receiving the at least one parsing event.

6. The method according to claim 1, wherein the data file includes at least one lexical component.

7. The method according to claim 6, wherein the scanner includes a lexical handler to process the at least one lexical component.

8. The method according to claim 1, wherein the data file is an XML file.

9. The method according to claim 1, wherein a type of data node is chosen from the group consisting of element, attribute, namespace and comment.

10. The method according to claim 1, wherein the process of flagging the repeating data nodes comprises:
determining whether one of the repeating data nodes is a top level data node; and
in response to a determination that the one of the repeating data nodes is a top level data node, preventing the one of the repeating data nodes from being flagged.

11. A system for generating metadata from a data file, the system comprising one or more processors coupled to a memory, the one or more processors when executing instructions encoded in the memory providing:
a parser for parsing a data file including data nodes arranged in a hierarchal structure by sequentially processing the data nodes to generate parsing events, a parsing event comprising a data node extracted from the data file; and
a scanner for receiving the at least one parsing event, the scanner configured to process the at least one parsing event by calling at least one corresponding function, flag repeating data nodes, add a reference to each of the repeating data nodes into a repeat list, and to generate a linear list of metadata from the processed at least one parsing event preserving the hierarchal structure of the data nodes, the linear list of metadata indicating the hierarchal structure of the data nodes and including only a single instance of each flagged repeating data node, the linear list being separate from the repeat list.

12. The system according to claim 11, wherein the scanner extracts the reference to the each data node from the stack and the corresponding component from the component list to generate a linear component list.

13. The system according to claim 11, wherein the scanner includes a parse handler for receiving the at least one parsing event.

14. The system according to claim 11, wherein the data file includes at least one lexical component.

15. The system according to claim 14, wherein the scanner includes a lexical handler to process the at least one lexical component.

16. The system according to claim 11, wherein the data file is an XML file.

17. The system according to claim 11, wherein type of data nodes is chosen from the group consisting of element, attribute, namespace and comment.

18. The system according to claim 11, wherein the scanner is further adapted to:
define a component corresponding to a single instance of the repeating data nodes, the component having data pertaining to the single instance of the repeating data nodes and being stored in a component list; and
generate and insert a reference to the single instance of the repeating data nodes into a stack, the stack adapted to preserve the hierarchal structure.

19. A set of computer-executable instructions for generating metadata from a data file, the computer-executable instructions recorded on a tangible computer-readable media and comprising the steps of:
parsing a data file including data nodes arranged in a hierarchal structure by sequentially processing the data nodes to generate parsing events, a parsing event comprising a data node extracted from the data file;
calling back at least one parsing event to a scanner;
processing by the scanner the at least one parsing event by calling at least one corresponding function;
flagging, by the scanner, repeating data nodes and adding a reference to each of the repeating data nodes into a repeat list; and
generating a linear list of metadata from the processed at least one parsing event preserving the hierarchal structure of the data nodes, the linear list of metadata indicating the hierarchal structure of the data nodes and including only a single instance of each flagged repeating data node, the linear list being separate from the repeat list.

20. The computer-executable instructions according to claim 19, wherein the instructions are stored on a computer-readable media, said media selected from a group consisting of magnetic media, optical media, read-only memory (ROM).

21. The computer-readable media of claim 19, wherein the instructions are executable by a computer system comprising a processor, a random access memory (RAM), at least one user input device, a data storage device and a graphical display device.

* * * * *